US005689340A

United States Patent [19]

Young

[11] Patent Number: 5,689,340
[45] Date of Patent: Nov. 18, 1997

[54] APPARATUS AND METHOD FOR MEASURING ALIGNMENT IN LENTICULAR MEDIA

[75] Inventor: Richard Dean Young, Fairport, N.Y.

[73] Assignee: Eastman Kodak Company, Rochester, N.Y.

[21] Appl. No.: 567,827

[22] Filed: Dec. 6, 1995

[51] Int. Cl.$^6$ .................................................. G01B 11/00
[52] U.S. Cl. .............................................. 356/401; 356/373
[58] Field of Search .......................... 356/399–401, 356/373; 250/548, 559.3; 359/463, 619, 620, 628, 455, 458

[56] References Cited

U.S. PATENT DOCUMENTS

| | | |
|---|---|---|
| 2,393,308 | 1/1946 | Brown . |
| 3,122,853 | 3/1964 | Koonz et al. . |
| 3,330,614 | 7/1967 | Cullis . |
| 3,582,984 | 6/1971 | Kurokawa . |
| 3,884,554 | 5/1975 | Lemelson . |
| 3,940,788 | 2/1976 | Abe et al. . |
| 4,417,784 | 11/1983 | Knop et al. . |
| 4,420,527 | 12/1983 | Conley . |
| 4,928,008 | 5/1990 | Huggins et al. ........................ 356/373 |
| 5,035,486 | 7/1991 | Inokuchi . |
| 5,110,210 | 5/1992 | Fay et al. .............................. 356/373 |
| 5,298,366 | 3/1994 | Iwasaki et al. . |
| 5,424,553 | 6/1995 | Morton . |

*Primary Examiner*—K. Hantis
*Attorney, Agent, or Firm*—Clyde E. Bailey, Sr.

[57] ABSTRACT

An apparatus (10) for measuring the location of lenticules (24) in lenticular media (14) having an encoded portion (14) located adjacent to the lenticules (24) comprises a light source (18) for illuminating the encoded portion (12). A sensor (20) is provided for receiving light referred and then transmitted by the encoded portion (12) that corresponds to the precise location of the encoded portion (12). Moreover, a processing means connecting the sensor (20) is provided for analyzing the signal so as to enable a precise location of the lenticules (24).

9 Claims, 5 Drawing Sheets

```
START
  ↓
ACQUIRE GRAY SCALE
IMAGE AND ADJUST LIGHT
BASED ON CONTRAST
  ↓
RE-ACQUIRE GRAY
SCALE IMAGE
  ↓
APPLY MORPH CLOSING
TO FILL IN WHITE
CUSP LINES
  ↓
APPLY MORPH OPEN
RESIDUAL TO ELIMINATE
BROAD WHITE LINES
  ↓
BINARIZE THE IMAGE TO
SEGMENT THE THIN
CUSP LINES
  ↓
APPLY BINARY OPENING
SERIES N-S TO ELIMINATE
NOISE
  ↓
APPLY BINARY
SKELETONIZATION
TO REDUCE TO SINGLE
PIXEL WIDE CUSP LINES
  ↓
APPLY VERTICAL
PROJECTION OF CUSP LINES
TO BOTTOM ROW
  ↓
FIND LOCATIONS OF CUSP
LINES IN BOTTOM ROW
  ↓
AT CUSP LINE CENTERS,
APPLY SUB PIXEL RULERS
TO ORIGINAL GRAY IMAGE
  ↓
  A
```

FIG. 11B

```
  A
  ↓
DETERMINE CENTER
POINTS OF CUSP LINE BY
MIDPOINT OF PAIRWISE
EDGES
  ↓
USE GEOMETRIC BEST LINE
FIT THROUGH POINTS TO
CALCULATE NEW CENTROID
  ↓
IDENTIFY ANY OUTLIERS
FROM BEST FIT LINE
AND RECALCULATE LINE
  ↓
DETERMINE ABSENT ZONE
FEATURE BY
LARGEST QUIET ZONE
  ↓
DETERMINE SYMMETRIC
PAIRS OF CUSP POINTS
ABOUT THE ABSENT ZONE
  ↓
CALCULATE MIDPOINT OF
PAIRWISE CUSPS AS
CENTER OF ABSENT ZONE
  ↓
DETERMINE OFFSET
FROM DESIRED
NOMINAL POSITION
  ↓
DETERMINE SKEW FACTOR
FROM TWO
CAMERA DATA
  ↓
CONVERT PIXEL CORRECTION
FACTORS TO THOUSANTHS
  ↓
OUTPUT RESULTS TO
DRIVE PRECISION MOTORS
OF TRANSLATION STAGES
  ↓
END
```

APPARATUS AND METHOD FOR MEASURING ALIGNMENT IN LENTICULAR MEDIA

FIELD OF THE INVENTION

The present invention relates generally to an apparatus and method for aligning lenticular material or media. More particularly, the invention is concerned with an apparatus and method for determining and measuring the location of an encoded lenticular pattern adjacent to lenticules in the lenticular media so that the precise location of the lenticules can be easily and automatically determined.

BACKGROUND OF THE INVENTION

Sheets of optically transparent material with a periodic lenticular pattern formed in its surface are used for producing 3-dimensional photographic depth visualization effects and minor animation effects in depth imaging articles. These imaging effects are best achieved under the proper viewing conditions of lenticular material or media (such as the media described in U.S. patent application Ser. No. 08/567,790, hereby incorporated herein by reference) that is precisely aligned and can, therefore, be assembled to a specially designed companion sheet. Alignment of one or more elements, such as the lenticular media, of depth imaging articles, and the like, are necessary because when improperly assembled only marginal quality depth visualization effects and minor animation effects results. When properly aligned, on the other hand, the imaging article is able to produce far more efficient and higher quality 3-D and animation visualizations.

Current techniques for assembling depth imaging articles involve manually aligning an element of the depth imaging system, such as the lenticules within the lenticular media relative to a designated companion sheet. The manual alignment approach makes use of the imaging effects and interaction that can be visualized when a lenticular media is in direct contact with, for example, a registration feature of a film sheet. Accordingly, it is appreciated that the manual alignment approach has undesirable shortcomings including its time consuming nature; and, it presents a high risk of human error with regard to positioning of critical imaging elements when very precise alignment is demanded. Moreover, the sheer complexity of manually aligning one or more of the imaging elements without the assistance of predetermined intrinsic features associated with one or more of the elements substantially frustrates the manual approach, and therefore diminishes its utility as a viable approach for achieving fast and efficient depth imaging effects.

U.S. Pat. No. 5,424,553 describes an optical technique for determining when lenticules within a material are properly aligned for printing applications. This technique requires the position adjustment of the lenticular material during the location measurement process in order to determine nominal placement.

Accordingly, there persists a need for an apparatus that can be used for precisely locating lenticular media for fully automatic high volume depth imaging systems.

It is, therefore, an object of this invention to provide an apparatus for measuring the location of lenticules in lenticular material or media which does not depend upon position adjustment of the lenticular media to determine its location.

It is a feature of the system of the invention that a processing means is provided for analyzing light intensity signals from the encoded portion of the lenticular material or media which corresponds to its location and which further enables the location of the lenticules in the media to be determined.

It is an advantage of the present invention that when it is desired to locate the main portion or lenticules of the lenticular media, the encoded portion is located and the location of the main portion is determined therefrom over a large lateral displacement range of media.

SUMMARY OF THE INVENTION

To accomplish these and other objects of the invention, there is provided, in one aspect of the invention, an apparatus for precisely measuring the location of a first portion in a material or media having adjacent first and second portions. The apparatus comprises a light source for illuminating the first portion and at least one sensor for receiving light from the illuminated first portion. The light refracted by the first portion generates a signal corresponding to the location of the first portion. Further, a processing means is provided for analyzing the signal and for determining the precise location of the first portion in the media.

In another aspect of the invention, a vision measurement system for precisely measuring the location of an encoded portion in lenticular media is provided comprising a light source, at least one sensor and a processing means, all as described above.

In yet another aspect of the invention, a method for determining the location of an encoded portion within lenticular material or media comprising adjacent encoded and main portions, comprises the steps of providing the apparatus, as described above. Further, the lenticular media is illuminated with the light source so as to illuminate at least the encoded portion. The sensor means are activated so as to receive light from the illuminated encoded portion. The light generates a signal comprising spatially dependent data corresponding to the precise location of the encoded portion. After the signal is generated, it is then processed so as to determine the location of the encoded portion.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE DRAWING

Figure 1:
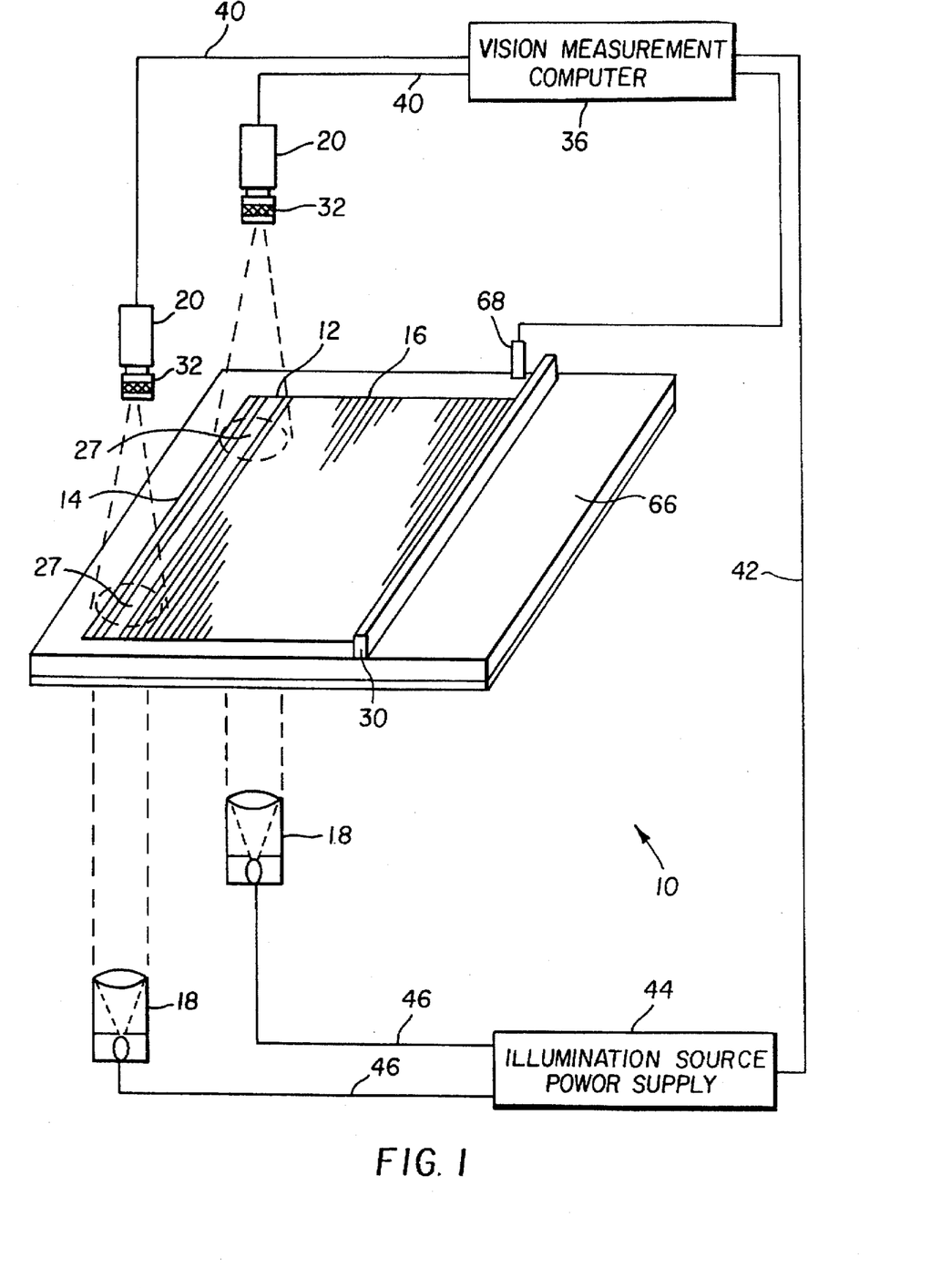
FIG. 1 is a diagrammatic view of the apparatus of the invention.

Turning now to the drawings, and in particular to FIG. 1, the apparatus 10 in accordance with the principles of the invention is illustrated. Broadly defined, the apparatus, also referred to as vision measurement system, 10, for precisely measuring the location of a first portion or encoded portion, 12, in a lenticular material, or media, 14, having adjacent first and second portions 12, 16 comprises a light source 18 for illuminating at least the first portion 12 of the lenticular media 14. Further, at least one sensor means, preferably a first and second camera (described below) 20, is provided for receiving light from the illuminated first portion 12. Moreover, a processing means, preferably a vision computer, 36, is included in this embodiment for analyzing the analog signal 46 from the light source and for determining the location of the first portion 12. The signal 46 comprises spatially dependent data corresponding to the location of the first portion 12 of the lenticular media 14.

Figure 2:
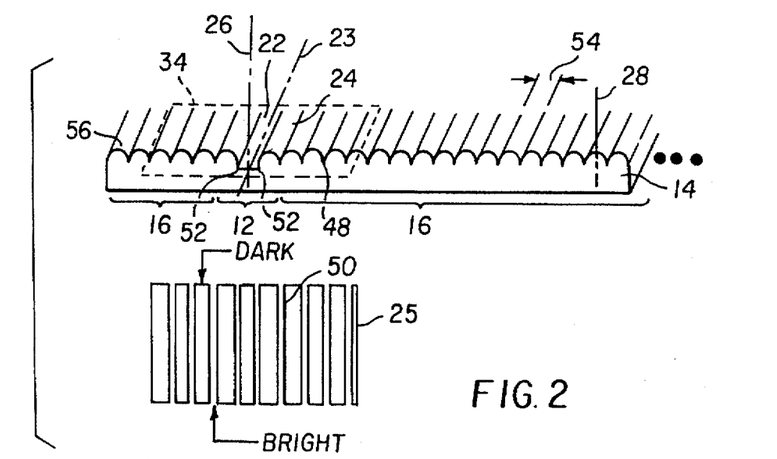
FIGS. 2-4 are perspective views of single planar region features.
Figure 3:
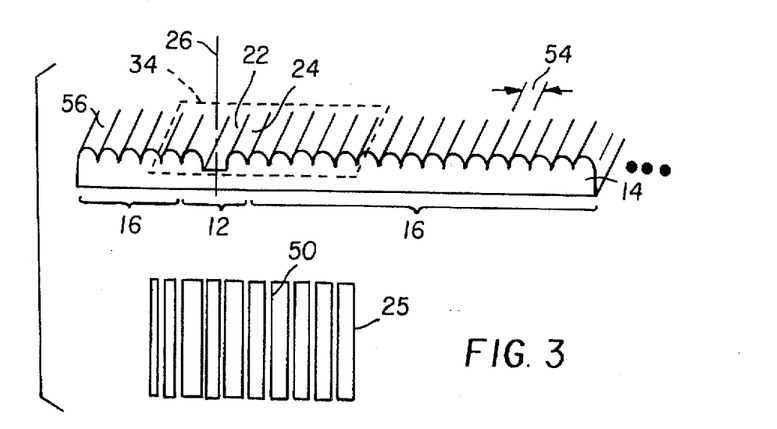
Figure 4:
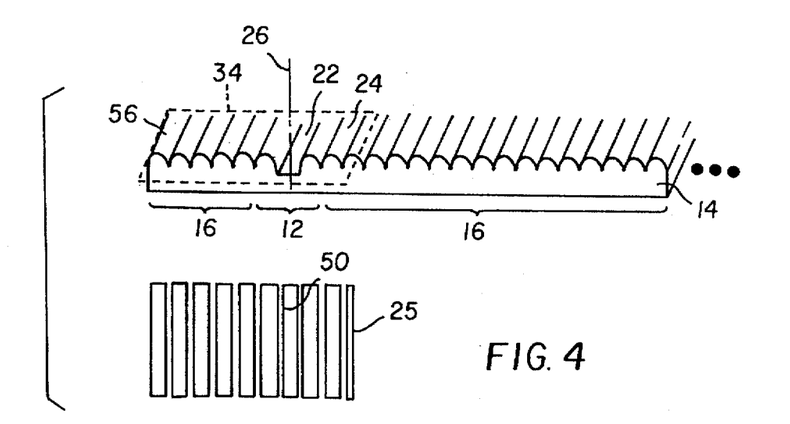

FIGS. 2–4 illustrate important features of the invention including a singular planar region 22 of encoded portion 12 bounded by adjacent lenticules 24 in lenticular media 14. According to FIG. 2, an image 25 of media 14 is shown substantially aligned, i.e., centered relative to the centerline 26 of encoded portion 12. In FIG. 3, on the other hand, the image 25 of media 14 is shown misaligned relative to centerline 26 of the encoded portion 12. Likewise, FIG. 4 shows image 25 misaligned to the right of the centerline 26 of encoded portion 12. Thus, I have found that the position measurement of encoded portion 12 can be determined precisely by vision measurement system 10 of the present invention taking into account the above findings. In general, the analysis of media 14 with system 10 takes into account the location of centerline 26 of the encoded portion 12 and centerline 28 of the lenticules 24. If centerline 26 is not only parallel but also preferably on centerline pitch with main portion 16 having lenticules 24, that is, equal to the spacing of the other lenticule features, then the position of all the centerlines 28 of lenticules 24 of main portion 16 can be precisely determined relative to the centerline 26 of the encoded portion 12 as an integer multiple of lenticular width 54, with multiplier n equal to the $n^{th}$ lenticule from encoded portion 12.

Referring again to FIG. 1, the vision measurement system 10 can also be used to perform accurate location measurements of skew and offset of the lenticule 24 by viewing the region encompassing the planar region 22 feature and adjacent lenticules 24. For two cameras each with an x, y pixel coordinate system and camera center 27 denoted as $x_c$, $y_c$, skew can be defined as the angle formed by line created by connecting the camera centers with a lengthwise axis 23 of encoded portion at centerline 26. The offset can be defined as the perpendicular distance from a line connecting camera centers 27 starting at coordinate $x_c$, $y_c$ of first camera 20 to the encoded portion's lengthwise axis 23 at centerline 26.

According to FIG. 1, the lenticular material or media 14 may be manually placed against the reference edge 30 of support means, or platen, 66, or it may be automatically introduced to the vision system 10 by a pick and place device (not shown), such as a robotic actuation arm. I prefer using the automatic method of introducing the media 14 to system 10 so as to eliminate human error factors. As shown in FIG. 1, a plurality of sensors, also referred to as imaging cameras, 20, are cooperatively mounted in system 10 to provide location data of encoded portion 12 of media 14. Preferably, at least two electronic cameras 20 (although one may suffice), with preferably 2-dimensional area array CCD sensor geometry, such as, Sony Model XC75, are positioned above the lenticular media 14 for viewing the planar region 22 of encoded portion 12. For greater accuracy of measurement, a spacing of at least 8 inches between first and second cameras 20 is preferred. First and second cameras 20 are both configured with a high quality imaging lens 32, such as Nikkor enlarging lens, to minimize optical aberrations and geometric distortions. Using a calibration target (not shown) with precisely located crosshair fiducial marks of known dimension which spans both cameras 20, the spatial coincidence of the cameras' centers 27 (FIG. 1) can be precisely determined by a vector correlation approach and the initial placement of cameras 20 adjusted accordingly to establish their centers 27 at a known distance from each other. According to FIG. 2, for both first and second cameras 20, the field of view 34 is preferably setup for high magnification so that at least five lenticule pitches are imaged. In this way, intensity measurements from light refracted from encoded portion 12 can be made to high accuracy to locate the planar region 22 of encoded portion 12. The use of first and second cameras 20, with one viewing the planar region, or absent lenticule, 22, at a point spaced apart from the other, and with both camera's 20 viewing the planar region 22, permits the skewness measurement to be more accurately determined by the vision computer 36 over the extended length of the media 14. Alternatively, skilled artisans would appreciate that other position sensing means could be deployed including arrays of photodiodes or lateral effect sensors. The illumination for the cameras 20 are provided by preferably collimated light sources 18. I prefer a light source comprised of components including tungsten lamps, pinhole aperture, condensor lens, and component holders manufactured by Spindler & Hoyer. The light sources 18 are configured in a transmissive mode through the lenticular media 14. Those skilled in the art will also appreciate that the illumination can be provided by other sources, such as, fiber illuminators, LED's, and lasers. Moreover, a skilled artisan can appreciate that vision system 10 of the invention has applicability to lenticular material, or media, 14, with single and patterned variant conic sectioned lenticules, of the type described in U.S. patent application Ser. No. 08/567,790.

Referring still to FIG. 1, the acquired image from each camera 20 is transmitted as an analog video signal 40 to the analog to digital converter (not shown) and frame buffer memory storage(not shown) residing within vision measurement computer 36. I prefer the vision computer manufactured by Applied Intelligent Systems Inc. (AISI), although there are perhaps others that are equally well suited for this function. The vision computer 36 also serves to control the illumination level of the light sources 38 by transmitting control signal 42 to the programmable light source power supply 44, whereupon DC power supply 44 sends appropriate analog signal 46 to each light source 18 supporting a respective camera 20, as shown in FIG. 1. Once images are acquired from both cameras 20, the vision computer 36 processes and analyzes the stored images to derive the measurement location information pertaining to lenticule media 14. The use of AISI's parallel processing architecture permits using morphological image processing techniques to robustly segment features of interest at fast processing speeds.

In FIG. 2, the centerline 26 of planar region 22 on lenticular media can be determined by various methods, including calculating the location of centerline 26 according to its neighboring lenticule attribute positions or using the imaged features of the planar region 22 itself to determine location as can be done by template correlated approaches. I prefer backlighting the media 14 with collimated light sources 18 to illuminate defined modified cusp points 52 of the adjacent lenticules 24 to the planar region 22 as thin bright lines, and then using these cusp lines 50 as reference points for calculating the centerline 26 of the planar region 22 to subpixel accuracies. The collimated backlight approach is preferred over reflective illumination configurations due to the minimized alignment sensitivity for the backlight and insensitivity to specular highlights shifting on lenticular surface. The illumination level is controlled by the vision computer 36 such that the cusp lines 50 of interest are maintained as high fidelity features which are not saturated with regard to intensity. This control is performed by a statistical analysis of acquired image contrast. The cusp points 48 are the intersection of adjacent lenticules 24 where the minima is formed by the meeting of the two conic sections. As depicted in FIG. 2, due to the optical refractive properties of the modified cusp points 52 associated with the boundary of a lenticule 24 to planar region 22 being different than a normal lenticule 24 to lenticule 24 cusp point 48 on the media 14, the corresponding imaged cusp lines can be distinguished. The cusp lines 50 imaged from modified cusps points 52 are of less intensity extent than the predominant bright cusp lines 50 for all normal lenticule to lenticule cusp points 48. Furthermore, using planar region 22 of a different width than standard lenticule width 54 permits further imaging distinction of the cusp lines 50 immediately adjacent to planar region 12.

For any of these bright cusp lines, various processing techniques, such as, finite difference and zero crossing detectors of the second gradient, can be employed to determine the edge locations of the finite width line and then subsequently determine the center of each cusp line 50. A least squares line fit modeling of the cusp line 50 center can further enhance the positioning accuracy as measured by the vision computer 36. With the cusp line 50 locations known associated with the planar region 22, the desired center position of the planar region that is on pitch with the periodic lenticules 24 can be determined by a basic midpoint math calculation between the cusp lines 50. Also, the calculated midpoints of other pairwise cusp lines 50 for lenticules 24 further distanced but symmetric about the planar region can be used to increase measurement location repeatability of planar region centerline 26.

Referring again to FIGS. 2–4, as indicated above, several representations of a collimated backlit lenticular material, or media, 14, under various lateral displacement shift (alignment) conditions. According FIGS. 2–4, lenticule cusp points 48 in the corresponding image are highlighted as bright cusp lines 50 and the planar region 22 as a differentiated intensity region in the acquired image. Although not illustrated in any of the drawings, the peak 56 of each lenticule 24 as well as the planar region 22 may image as broad bright bands depending on the incident angle of the illumination. The cusp lines 50 of interest, however, can still be delineated and measured by their limited widthwise extent. For the case where excessive banding occurs in the planar region 22, and the modified cusp lines 52 are no longer distinct, other pairwise cusp lines 50 which are symmetric about the planar region 22 can be used to calculate centerline 26. I prefer to perform location measurements of the cusp lines 50 and 52 rather than the wider bands within the lenticule peaks 56 and planar regions due to the improved accuracy of location measurements from the well defined unsaturated intensity edges of the cusp line 50 features. Thus, lateral shifts of the media 14 causes a corresponding shift of modified cusp lines 52 in the images, and the centerline 26 of planar region 22 can be calculated as previously described. Banding effects can be reduced by tilting the light source 18 with respect to vertical axis of camera 20.

Figure 5:
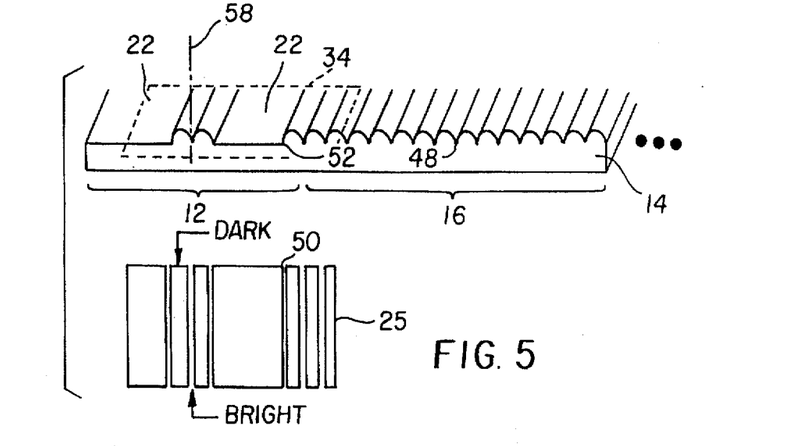
FIGS. 5-7 are perspective views of lenticule pair bounded by planar regions.
Figure 6:
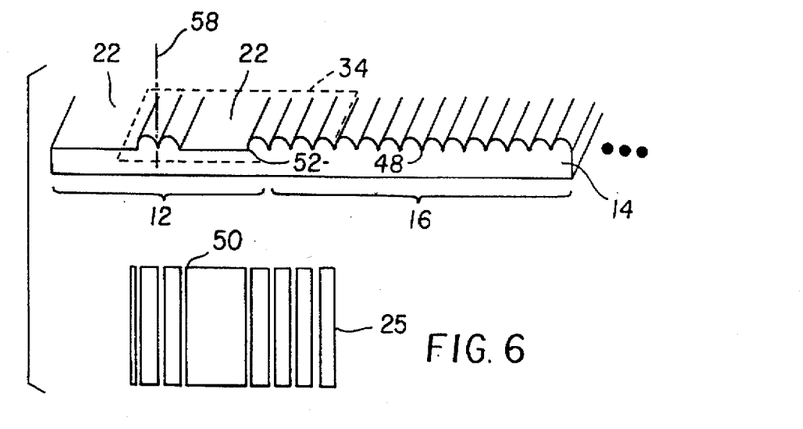
Figure 7:
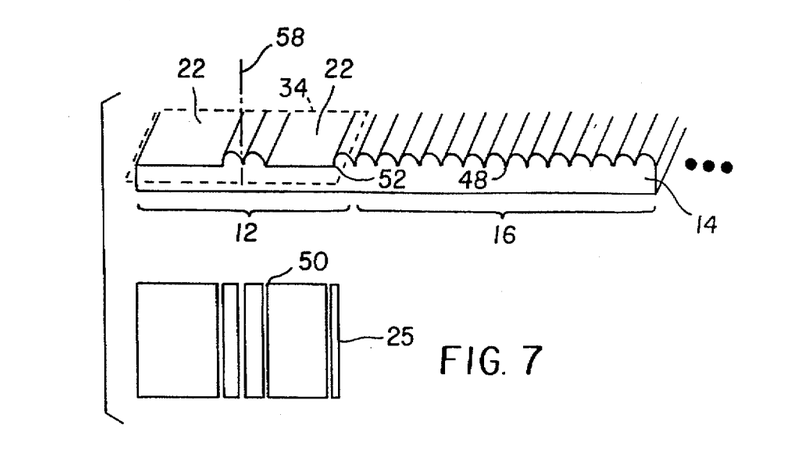

In FIGS. 5–7, alternative complementary configurations of encoded portion 12 using a single pair of lenticules 24 bounded by planar regions 22 is depicted. In these configurations, the isolated lenticule pair centerline 58, as defined by the cusp point 48, is the desired datum of interest and is offset by a half lenticule pitch. The corresponding image shows the lenticule pair center 58 imaging as a bright cusp line 50 with the modified cusp points 52 imaging as less intense bright cusp lines 50.

Figure 8:
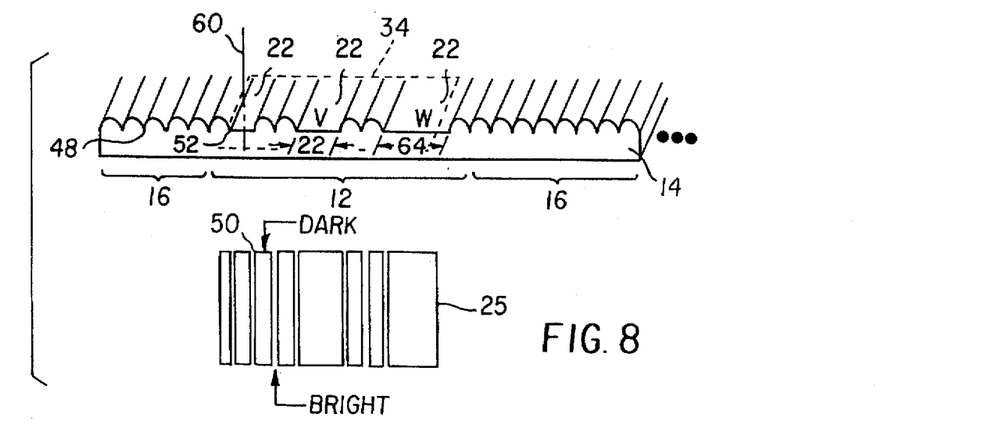
FIGS. 8-10 are perspective views of spatial encoded pattern of multiple planar regions shown in perspective view.
Figure 9:
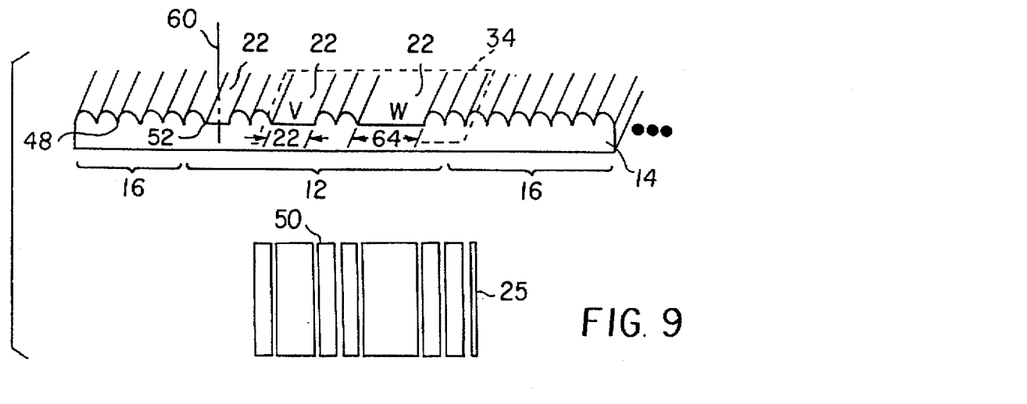
Figure 10:
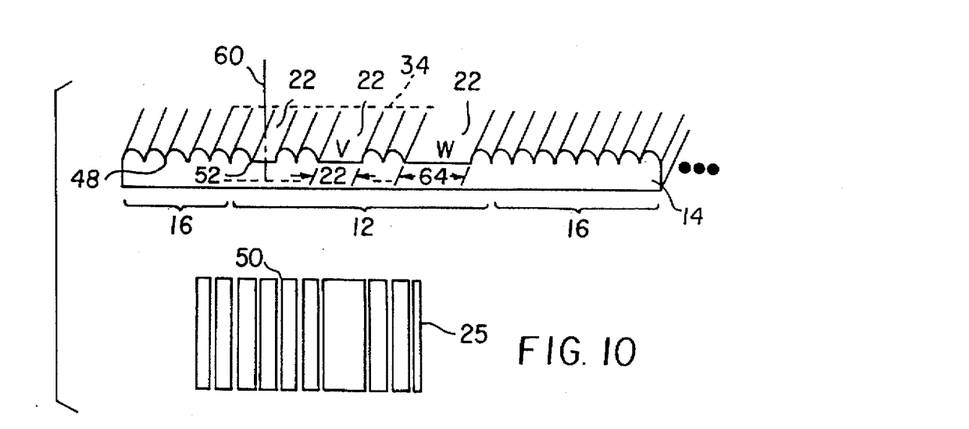

Referring to FIGS. 8–10, if one uses a pattern of planar region 22 zones on the media 14, the sheet's lateral position dynamic range of locating features, such as centerlines 26, is improved by the expanded encoded portion 12. The advantages of using a series or pattern of planar regions 22 amongst the periodic array of lenticules 24 are many. First, a high optical magnification with the camera field of view 34 preferably encompassing a plurality of lenticule pitches (preferably at least five) is recommended to maintain high measurement accuracy for the aforementioned vision system. This arrangement will still enable the cameras to view the significant portions of various encoded patterns. Furthermore, due to a unique pattern encoded in the media 14 as either planar regions 22 of varying widths (i.e. one, two, three, etc. lenticule widths wide), multiple single width planar regions 22 in a pattern unique to that lateral spatial position on the media 14, or a combination thereof, the analysis of the images acquired from the firs and second cameras 20 provides absolute location and precise skewness measurements over a larger displacement range of lenticular media 14. Further according to FIGS. 8–10, if the displacement of the lenticular media 14 is large such that the lenticular datum of interest indicated as "U" 60 is beyond the cameras' field of view 34, precise positioning of the media 14 can still be achieved by viewing the region "V" 62 or "W" 62 of the encoded portion 12 presented to the camera 20 and knowing the "V" 62 or "W" 64 pattern's absolute encoded location relative to the lenticule datum 60 outside the camera's view 34. Another advantage of encoding the lenticular media 14 is that a greater use of the main portion 16 can be achieved by including a series of planar regions 12 having varying widths (i.e., smaller or larger than nominal) and corresponding varying widths of adjacent lenticule 24 within the encoded portion 12.

The preferred sequence of operation for the described lenticular media alignment apparatus 10 is discussed below. The operation is described for a media 14 with a singular planar region 22 as the encoded portion 12; however, the method with minor modification can be applied to other lenticular encoded formats as well. Initially, during camera 20 setup, a calibration and alignment procedure is performed for both cameras 20 which defines the desired nominal centerline location of either the lenticule 24 adjoining encoded portion 12 or the encoded portion 12 itself with respect to each camera's 20 local x-y pixel coordinate system. This defines not only the nominal location of centerline 26 of encoded portion, but the nominal angular orientation of the centerline 26 required. The alignment procedure also permits the precise mechanical setup of each camera 20 such that they are parallel to each other and on known centers 27, with the distance between the alignment targets' centerpoints well defined due to the precision alignment target (not shown) spanning both cameras 20.

During normal operations of apparatus 10, the lenticular media 14 is coarsely presented on the platen 66 using a pick and place device (not shown), and pushed against the platen's reference edge 30 so that the media's encoded portion 12 will be encompassed within each camera's field of view 34 with the lengthwise axis of any lenticule 24 somewhat parallel to the camera's y-axis. The media 14 is then held on the platen 66 with a clamping mechanism (not shown). The clamping mechanism is actuated by, for example, a photosensor 68 having the capability to sense that the media 14 is properly positioned against reference edge 30 of the platen 66. The procedure below describes the method for precisely locating the lenticular media 14 position with regard to offset and skew prior to any critical assembly or interfacing processes involving lenticular media 14.

Figure 11A:
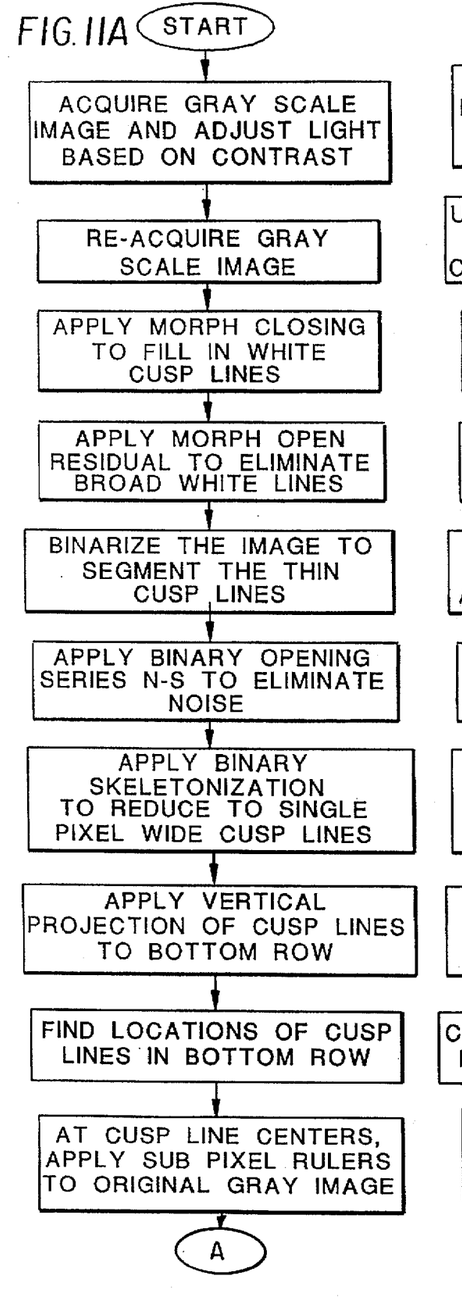
FIG. 11 is a flow chart of the method of locating encoded portions in the lenticular material or media.
Figure 11B:
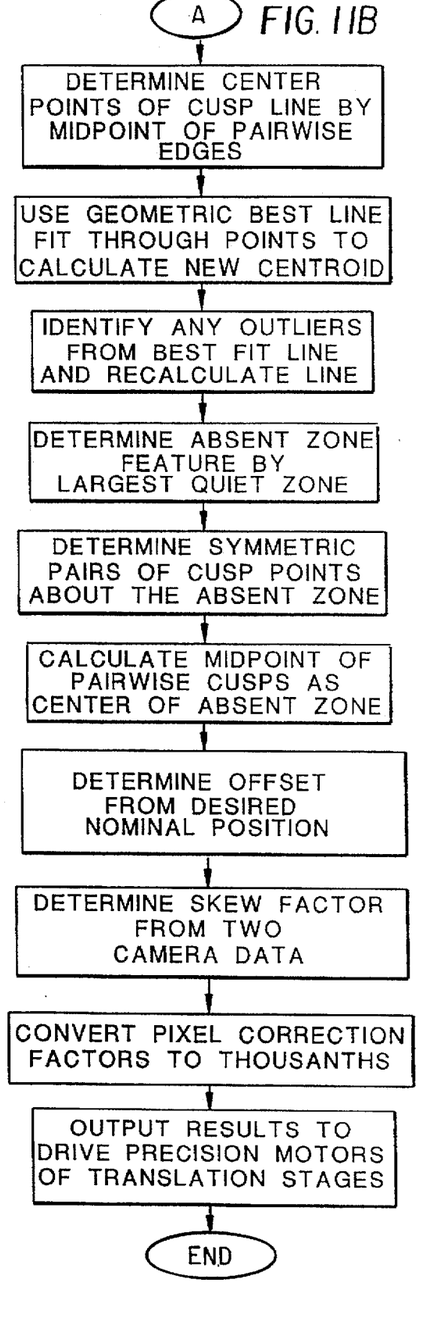

In FIG. 11, to accurately determine the location of the lenticular media 14, the light intensity level of light sources 18 are set for nominal setting and then first camera 20 acquires a gray scale image of the encoded portion 12 of lenticular media 14. This is the first step of the processing algorithm executed by the vision computer 36. An intensity histogram modal analysis in a selected region of interest is performed to determine if adequate cusp line 50 feature brightness is established. If not, the light intensity level is adjusted by the vision computer 36 using a linear mapped lookup table for intensity and another image is acquired at the corrected light level setting. The image is stored in a frame buffer (not shown) within vision computer 36 and designated as the original image. To accommodate any media 20 quality shortcomings, such as roughness in cusp lines 50, pre-processing steps are performed to a frame buffer copy of the original gray scale image. By first applying a gray scale morphological closing with a vertically dominant structuring element orientation, any gaps in the imaged cusp lines 50 are filled. The next step of applying a morphological opening residual with horizontally oriented structuring element of widthwise dimension just greater than the cusp line 50 width in pixels, eliminates any broad white bands in the acquired image. At this stage, after the residual operation, the resultant gray scale image has only bright cusp line 50 features remaining with a background intensity level of zero gray level.

Referring again to FIG. 11, the next steps in the processing are to perform binary image operations to determine the coarse location of cusp lines 50. Edge finding operations in the binary image state are performed more rapidly by vision computer 36 in coarsely locating the cusp lines 50 than can be realized by applying full image width gray scale ruler gauges to the original gray scale image. A fixed threshold level is applied to the resultant gray scale residual image to generate a binary image of cusp line 50 features, represented as ones in the foreground. To remove any binary spot noise in the image not associated with straight cusp lines 50, such as may be introduced by contaminates, a binary morphological opening with vertically dominant structuring element orientation can then be applied. A binary skeletonization of the image is then performed to reduce cusp lines 50 to single pixel width. A vertical projection of the skeletonized image is then performed down each column of the image to a lower row designated as projection row in the image. A pixel in the projection row will equal one only if within its associated column of pixels, at least one pixel had a value of one. The locations of the cusp lines 50 are determined by reading the binary pixel values of projection row. The coarse locations of cusp lines 50 are then stored in memory to be utilized for locating subsequent placement of higher precision measurement gauging methods. Furthermore, the coarse location of the encoded portion 12 as the center pixel associated with the largest continuous span of zeros in the projection row is stored in memory.

After the binary processing is complete, higher precision gray scale subpixelation gauges designated as rulers are centered about the cusp lines 50 in the saved original gray scale image at previously determined coarse pixel locations from projection row. These gray scale rulers centered about the cusp lines 50 are of very short length extent to optimize processing cycle time. For each cusp line 50, many rulers are placed about the cusp line 50 at different locations along the cusp line's lengthwise extent. Each individual ruler determines by a zero-crossing of the second finite difference the precise location of leading and trailing edge of the cusp line 50 as each pixel associated with the ruler's graphical line overlay is analyzed. This ruler technique as applied to the lenticules cusp lines 50 provides better than one-fifth subpixelation accuracy in locating edges, and a precision midpoint is calculated from the edge pair locations. For a given cusp line 50, the calculated midpoints along its length are used in a best line model fit to further increase the locating precision of the cusp line 50. A parameter empirically derived determines if any individual data midpoint departs too much from the best line fit. If so, the individual data midpoint is removed as an outlier and the best line model fit for a cusp line's center is repeated using the remaining midpoints. At this stage, for each cusp line 50 a best line model fit is determined such that for any given row in the image, corresponding center locations of cusp lines 50 crossing the row can be very precisely calculated. It is preferred to use the center most row $y_c$ in image to determine cusp line 50 position.

Based on the previous information determined during the analysis of the binary projection row, the coarse location of encoded region 12 is determined. Using the two cusp lines 50 symmetrically located about the coarse location of encoded region 12, for any given row a precise center location of the encoded region 12 can be determined by calculating the midpoint between the two cusp line 50 centers as determined by their best line model fit crossing center most row. Alternatively, if one uses the two cusp lines 50 on the right (or to the left) of the encoded region 12 location determined by the binary projection, the precise center 28 of a lenticule feature itself of known offset distance from the encoded region centerline 26 is determined by a calculated midpoint. The selected midpoint calculated at a given image row, preferably the center row in the image, is stored for subsequent offset calculation.

The above processing sequence described for first camera 20 is then repeated for second camera 20 beginning at the image acquisition step of FIG. 11. At the completion of the operational sequence for the second camera 20, precise location of encoded portion 12 for a given center row $y_c$ in the image is known for that camera 20 position. Using the location of centerline 26 of the encoded portion 12 from both first and second cameras 20, and knowing a predetermined physical distance between centers 27 of both first and second cameras 20, the skew of the lenticular media 14 can be precisely calculated. By using the difference between the location of centerline 26, as determined by first camera 20, and the nominal location of centerline 26, as viewed by first camera 20 during alignment procedure, the offset distance from nominal can be determined for lenticular media 14. Thus, the location of lenticular media 14 in terms of skew and offset can therefore be precisely determined for subsequent critical assembly or interfacing processes.

PARTS LIST

10 . . . apparatus or vision measurement system
12 . . . encoded portion or first portion
14 . . . lenticular material or media
16 . . . main portion or second portion
18 . . . light source
20 . . . sensor means, or first and second cameras
22 . . . planar region 23 . . . centerline axis of encoded portion
24 . . . lenticule
25 . . . image
26 . . . centerline of encoded portion
27 . . . center of camera
28 . . . centerline of lenticules
30 . . . reference edge of platen
32 . . . imaging lens
34 . . . field of view of cameras
36 . . . vision computer
40 . . . analog video signal
44 . . . programmable light source power supply
46 . . . analog signal for light source
48 . . . cusp points
50 . . . cusp line
52 . . . modified cusp point
54 . . . lenticule width
56 . . . peak of lenticule
58 . . . lenticule pair centerline
60 . . . lenticule datum "U"
62 . . . region "V"
64 . . . region "W"
66 . . . platen
68 . . . photosensor While the invention has been described with a certain degree of particularity it is manifest that many changes may be made in the details of construction and the arrangements of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

I claim:

1. An apparatus for precisely measuring the location of a first portion relative to a second portion in a single sheet of lenticular media, wherein said first portion is adjacent to said second portion within said media, and wherein said lenticular media is coplanarly adjacent to said first and second portions, the apparatus comprising:

a light source for illuminating at least the first portion adjacent to said second portion within said single sheet of said lenticular media;

at least one sensor for receiving light from the illuminated first portion, said sensor producing a signal corresponding to said first portion;

a processing means for analyzing said signal and for determining the location of said first portion, said signal comprising spatially dependent data corresponding to the location of said first portion.

2. A vision measurement system for precisely measuring the location of an encoded portion relative to a main portion in a single sheet of lenticular media, said single sheet of lenticular media being coplanarly adjacent to said encoded portion and said main portion, and wherein said encoded portion is adjacent to said main portion within said lenticular media, the vision system comprising:

a light source for illuminating at least the encoded portion adjacent to said main portion within said lenticular media;

at least one sensor for receiving light from the illuminated encoded portion, said sensor producing a signal corresponding to said encoded portion;

a processing means for analyzing said signal and determining the location of said encoded portion, said signal comprising spatially dependent data corresponding to the location of said encoded portion.

3. The system recited in claim 2 wherein said location of said encoded portion enables a precise determination of the location of said main portion.

4. The system recited in claim 2 wherein said light source is a collimated tungsten halogen source configured for transmissive illumination.

5. The system recited in claim 2 wherein said at least one sensor is an electronic CCD camera device with imaging lens.

6. The system recited in claim 2 wherein said processing means comprises a vision computer having precision measurement algorithms for locating the positions of lines and edges characteristic of said encoded portion and main portion of said media.

7. A method for determining the location of an encoded portion relative to a main portion within a single sheet of lenticular media, said lenticular media being coplanarly adjacent to said encoded portion and said main portion, and wherein said encoded portion is adjacent to said main portion within said lenticular media, said method comprising the steps of:

providing the system recited in claim 2;

illuminating said single sheet of lenticular media with said light source so as to illuminate at least said encoded portion adjacent said main portion within said single sheet of said lenticular media;

providing said at least one sensor for detecting light from said illuminated encoded portion, said light generating a signal comprising spatially dependent data corresponding to the precise location of said encoded portion; and, processing said signal so as to determine the location of said encoded portion.

8. The method according to claim 7 wherein said processing step comprises the step of locating a first centerline of said encoded portion and then determining a second centerline of said main portion, said second centerline defining the measured location of the main portion.

9. The method according to claim 8 further comprising the step of comparing the measured location of said main portion with an expected location of the main portion.

* * * * *